US009564186B1

(12) United States Patent
Zhu et al.

(10) Patent No.: US 9,564,186 B1
(45) Date of Patent: Feb. 7, 2017

(54) METHOD AND APPARATUS FOR MEMORY ACCESS

(71) Applicant: MARVELL INTERNATIONAL LTD., Hamilton (BM)

(72) Inventors: Zhou Zhu, Shanghai (CN); Xinyan Wu, Shanghai (CN); Xiaofan Tian, Shanghai (CN); Jiaquan Su, Shanghai (CN)

(73) Assignee: Marvell International Ltd., Hamilton (BM)

( * ) Notice: Subject to any disclaimer, the term of this patent is extended or adjusted under 35 U.S.C. 154(b) by 71 days.

(21) Appl. No.: 14/177,804

(22) Filed: Feb. 11, 2014

Related U.S. Application Data

(60) Provisional application No. 61/765,336, filed on Feb. 15, 2013.

(51) Int. Cl.
*G06F 12/00* (2006.01)
*G11C 7/10* (2006.01)
*G06F 3/06* (2006.01)

(52) U.S. Cl.
CPC ........... *G11C 7/1072* (2013.01); *G06F 3/0625* (2013.01); *G06F 3/0628* (2013.01)

(58) Field of Classification Search
CPC .............................. G06F 3/0625; G06F 3/0628
USPC ......................................................... 711/105
See application file for complete search history.

(56) References Cited

U.S. PATENT DOCUMENTS

| 6,212,599 | B1* | 4/2001 | Baweja et al. ................. 711/106 |
| 8,810,589 | B1* | 8/2014 | Khoury .................. G09G 5/395 345/531 |
| 2001/0035875 | A1* | 11/2001 | Suzuki .................... G06T 11/60 715/723 |
| 2003/0071908 | A1* | 4/2003 | Sannoh ............. H04N 5/23212 348/345 |
| 2003/0206164 | A1* | 11/2003 | Juenger ..................... G09G 5/39 345/211 |
| 2005/0132181 | A1* | 6/2005 | Kashiwada .................... 713/100 |
| 2005/0172074 | A1* | 8/2005 | Sinclair ......................... 711/114 |
| 2007/0208921 | A1* | 9/2007 | Hosouchi .............. G06F 1/3203 711/170 |
| 2008/0154920 | A1* | 6/2008 | Guha .................. G06F 17/3089 |
| 2008/0225132 | A1* | 9/2008 | Inaguma ................ H04N 5/247 348/222.1 |
| 2008/0310758 | A1* | 12/2008 | Kashibuchi ........... G06T 3/4023 382/293 |
| 2009/0055580 | A1* | 2/2009 | Moscibroda et al. ........ 711/104 |
| 2009/0292869 | A1* | 11/2009 | Stern ..................... G06F 1/3287 711/113 |
| 2010/0157463 | A1* | 6/2010 | Arizono et al. ........... 360/73.03 |
| 2010/0313043 | A1* | 12/2010 | Tsukada et al. .............. 713/320 |
| 2013/0111123 | A1* | 5/2013 | Thayer .................... G06F 13/16 711/105 |

(Continued)

*Primary Examiner* — Prasith Thammavong

(57) ABSTRACT

Aspects of the disclosure provide an integrated circuit that includes a first memory controller, a second memory controller and at least a functional circuit coupled to the second memory controller. The first memory controller is configured to control memory access to a first memory. The second memory controller is configured to control memory access to a second memory that is able to be turned on/off. The functional circuit is configured to operate based on the second memory. The second memory controller is configured to cause the second memory to be turned on when an application requires an operation of the functional circuit.

20 Claims, 2 Drawing Sheets

(56) References Cited

U.S. PATENT DOCUMENTS

2014/0059359 A1\* 2/2014 Bahirat .................. G06F 1/324
713/300
2015/0081989 A1\* 3/2015 Lee ..................... G06F 12/0607
711/157

\* cited by examiner

METHOD AND APPARATUS FOR MEMORY ACCESS

INCORPORATION BY REFERENCE

This present disclosure claims the benefit of U.S. Provisional Application No. 61/765,336, "ASYMMETRIC DYNAMIC RANDOM ACCESS MEMORY" filed on Feb. 15, 2013, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Memory devices are used in electronic systems for various storage purposes. Many types of memory devices have been developed. Different types of memory devices have different characteristics, and are suitable for different storage purposes.

SUMMARY

Aspects of the disclosure provide an integrated circuit that includes a first memory controller, a second memory controller and at least a functional circuit coupled to the second memory controller. The first memory controller is configured to control memory access to a first memory. The second memory controller is configured to control memory access to a second memory that is able to be turned on/off. The functional circuit is configured to operate based on the second memory. The second memory controller is configured to cause the second memory to be turned on when an application requires an operation of the functional circuit.

According to an aspect of the disclosure, the first memory controller is configured to control memory access to a first dynamic random access memory (DRAM) and the second memory controller is configured to control memory access to a second DRAM having a high power consumption than the first DRAM and having a higher bandwidth than the first DRAM. In an embodiment, the second memory controller is configured to cause the second DRAM to be turned on when the first DRAM lacks bandwidth to support operations of functional circuits in the integrated circuit.

According to an aspect of the disclosure, the integrated circuit includes a second functional circuit coupled to the first memory controller and configured to operate based on the first memory. Further, the integrated circuit includes a third functional circuit coupled to both the first memory controller and the second memory controller and configured to operate based on the first memory when the second memory is turned off, and operate based on the second memory when the second memory is turned on.

Aspects of the disclosure provide a method for memory access by an integrated circuit. The method includes operating based on memory access to a first memory with a second memory being turned off, activating a functional circuit configured to operate based on the second memory, causing the second memory to be turned on, and accessing the second memory to support an operation of the functional circuit.

Aspects of the disclosure provide an electronic system that includes a first memory, a second memory that is able to be turned on/off, and an integrated circuit. The integrated circuit includes a first memory controller configured to control memory access to the first memory, a second memory controller configured to control memory access to the second memory and at least a functional circuit coupled with the second memory controller and configured to operate based on the second memory. The second controller is configured to cause the second memory to be turned on when an application requires an operation of the functional circuit.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
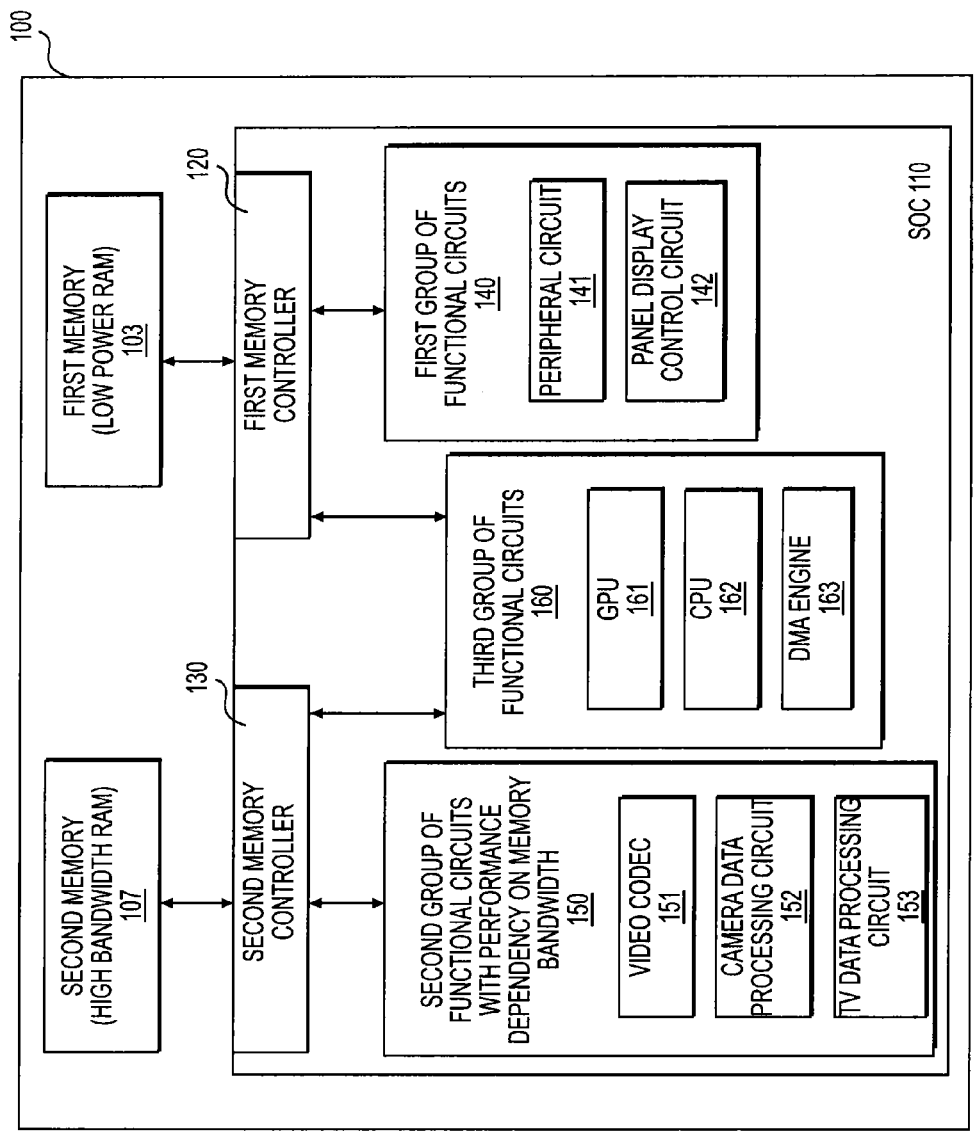
FIG. 1 shows a block diagram of an electronic system example 100 according to an embodiment of the disclosure.

FIG. 1 shows a block diagram of an electronic system example 100 according to an embodiment of the disclosure. The electronic system 100 includes a processing component 110 and a plurality of memory components, such as a first memory 103, a second memory 107, and the like coupled together as shown in FIG. 1. The plurality of memory components has different characteristics, such as different power consumption characteristics, different bandwidth characteristics and the like. In an example, the first memory 103 is implemented with low power technology and has much lower power consumption than the second memory 107, and the second memory 107 is implemented with a high bandwidth technology and has a much higher bandwidth than the first memory 103. The processing component 110 is configured to selectively activate the memory components and enable memory access to the activated memory components in order to achieve performance satisfaction and low power consumption.

The electronic system 100 can be any suitable system, such as a desktop computer, a laptop computer, a tablet computer, a gaming computer, a smartphone, a multimedia device, and the like. In an embodiment, the electronic system 100 is a mobile device, and low power consumption is preferred for the mobile device.

According to an aspect of the disclosure, many applications can be performed on the electronic system 100, and one or more of the applications have a high bandwidth requirement to achieve performance satisfaction. In an embodiment, one of the memory components is configured to have a high bandwidth, and the memory component is selectively turned on when the high bandwidth is required, for example, when the applications that require the high bandwidth run on the electronic system 100. Generally, the high bandwidth memory component consumes relatively large power. The high bandwidth memory component can be turned off when the high bandwidth is not required in order to save power.

Specifically, in the FIG. 1 example, the processing component 110 is a system on chip (SOC) 110 that integrates various functional circuits 140-150 on a same chip. The SOC 110 is coupled with the plurality of memory components, such as the first memory 103 and the second memory 107 in the FIG. 1 example. According to an aspect of the disclosure, the first memory 102 and the second memory 107 have different memory characteristics and are not compatible due to, for example, different signaling voltages, different timings, and the like.

In an example, the first memory 103 includes one or more memory chips implemented using low power technology, such as low power synchronous dynamic random access memory (SDRAM) chips, low power double data rate (DDR) SDRAM chips, and the like; the second memory 107 includes one or more memory chips implemented using high bandwidth technology, such as DDR3 chips, and the like. In an example, the DDR3 chips use specific signaling voltage levels and specific timings that are different from other memory technologies, such as the low power technology used in the first memory 103. Thus, the first memory 103 and the second memory 107 are not compatible in the example.

According to an aspect of the disclosure, the SOC 110 includes suitable memory controllers respectively interfacing memory components that are not compatible. In the FIG. 1 example, the SOC 110 includes a first memory controller 120 configured to interface the first memory 103, and a second memory controller 130 configured to interface the second memory 107. The first memory controller 120 is configured to provide signals, such as control signals, clock signals, instruction signals, address signals, data signals, and the like, suitable for the first memory 103. Further, the first memory controller 120 is configured to receive and process data signals from the first memory 103 in response to a read operation, and provides the received data signals in the suitable format to the functional circuits within the SOC 110.

The second memory controller 130 is configured to provide signals, such as control signals, clock signals, instruction signals, address signals, data signals, and the like, suitable for the second memory 107. Further, the second memory controller 130 is configured to receive and process data signals from the second memory 107 in response to a read operation, and provide the received data signals in the suitable format to the functional circuits on the SOC 110.

According to an aspect of the disclosure, the electronic system 100 has a regular operation mode that does not require high DRAM bandwidth, and a high bandwidth mode that requires relatively high DRAM bandwidth. In an embodiment, when one or more high resolution multimedia applications, such as a 3-dimensional (3D) gaming application, a high definition (HD) TV application, a high resolution imaging application, and the like, are running on the electronic system 100, the electronic system 100 perform functions, such as video encoding/decoding, high resolution image processing, high resolution TV data processing, and the like, that require high speed buffers in order to achieve satisfactory user experience, and the electronic system 100 is in the high bandwidth mode. When the electronic system 100 does not perform those functions, the electronic system 100 is in the regular operation mode.

According to an aspect of the disclosure, the SOC 110 includes various functional circuits 140-160. Some functional circuits are configured to perform certain functions that require high speed buffers, some functional circuits do not require high speed buffers, and some functional circuits may or may not require high speed buffers. The functional circuits 140-160 are respectively coupled to the first memory controller 120 and/or the second memory controller 130 based on their memory access speed requirements. In the FIG. 1 example, a first group of functional circuits 140 is coupled to the first memory controller 120, a second group of functional circuits 150 is coupled to the second memory controller 130, and a third group of functional circuits 160 is coupled with both the first memory controller 120 and the second memory controller 130.

In an embodiment, functional circuits for sustaining the electronic system 100 in the regular operation mode, such as peripheral circuits 141 (e.g., keyboard interface, USB interface, etc.), a panel display control circuit 142 and the like, do not require high bandwidth memory access, and can operate based on memories with relatively low bandwidth. In the FIG. 1 example, the first group of functional circuits 140 includes functional circuits that do not require high bandwidth buffers, such as the peripheral circuit 141, the panel display control circuit 142, and the like. The first group of functional circuits 140 is coupled with the first memory controller 120 and operates based on the first memory 103. In an example, the first memory 103 is configured to stay active to support the operation of the electronic system 100 in the regular operation mode. Because the first memory 103 is implemented with low power technology, the electronic system 100 has a reduced power consumption.

Further, the SOC 110 also includes functional circuits that require high bandwidth memory access to support their performance. In the FIG. 1 example, the SOC 110 includes a video coder-decoder (CODEC) 151 configured to perform 3-dimensional video data encoding/decoding. The video CODEC 151 requires high bandwidth buffers to achieve performance satisfaction. In the FIG. 1 example, the video CODEC 151 is coupled to the second memory controller 130. When the video CODEC 151 starts operation, for example, in a 3D-gaming application, the video CODEC 151 performs encoding/decoding based on buffers allocated in the second memory 107.

In another example, the SOC 110 includes a camera data processing circuit 152 configured to process high resolution image data taken by a high resolution camera. The camera data processing circuit 152 requires high bandwidth buffers to achieve performance satisfaction. In the FIG. 1 example, the camera data processing circuit 152 is coupled to the second memory controller 130. When the camera data processing circuit 152 starts operation, for example, in a high resolution image recording application, the camera data processing circuit 152 performs camera data encoding based on buffers allocated in the second memory 107.

In another example, the SOC 110 includes a TV data processing circuit 153 configured to process data for a high definition (HD) TV, for example, to be send via a high definition multimedia interface (HDMI). The TV data processing circuit 153 requires high bandwidth buffers to achieve performance satisfaction for improved user experience. In the FIG. 1 example, the TV data processing circuit 153 is coupled to the second memory controller 130. When the TV data processing circuit 153 starts operation, for example, to provide HDTV data for HDMI in a television application, the TV data processing circuit 153 performs data processing based on buffers allocated in the second memory 107.

In addition, the SOC 110 also includes functional circuits whose performance may or may not require high speed buffers. In the FIG. 1 example, the SOC 110 includes a graphic processing unit (GPU) 161 configured for graphic processing. In an example, the GPU 161 is configured to be able to perform graphic processing of relatively high resolution and relatively low resolution. When the GPU 161 performs high resolution image processing, the GPU 161 requires fast buffers, and when the GPU 161 performs low resolution image processing, the first memory 103 can satisfy the buffer bandwidth requirement. In the FIG. 1 example, the GPU 161 is coupled to both the first memory controller 120 and the second memory controller 130. Thus, when an application causes the GPU 161 to perform graphic processing of low resolution, buffers for the application are allocated in the first memory 103, and the GPU 161 operates for the application based on the buffers allocated in the first memory 103; when an application causes the GPU 161 to perform graphic processing of high resolution, buffers for the application are allocated in the second memory 107, and the GPU 161 operates for the application based on the buffers allocated in the second memory 107.

In another example, the SOC 110 includes a central processing unit (CPU) 162 configured for executing software instructions, such as software instructions of applications. The software instructions may or may not require high bandwidth memory access. In the FIG. 1 example, the CPU 162 is coupled to both the first memory controller 120 and the second memory controller 130. Thus, in an example, when software instructions in an application do not require high bandwidth memory access, memory space in the first memory 103 is allocated for the application, and the CPU 162 operates based on the allocated memory space in the first memory 103 for the application; when software instructions in an application require high bandwidth memory access, memory space in the second memory 107 is allocated for the application, and the CPU 162 operates based on the allocated memory space in the second memory 107 for the application.

Further, the SOC 110 includes a direct memory access (DMA) engine 163 configured to allow certain hardware subsystems (not shown) within the SOC 110 to access the first memory 103 and the second memory 107 independently of the CPU 162. In the FIG. 1 example, the DMA engine 163 is coupled to both the first memory controller 120 and the second memory controller 130. Thus, in an example, when a subsystem in an application does not require high bandwidth memory access, memory space in the first memory 103 is allocated for the application, and the subsystem operates based on the allocated memory space in the first memory 103 for the application; when a subsystem in an application requires high bandwidth memory access, memory space in the second memory 107 is allocated for the application, and the subsystem operates based on the allocated memory space in the second memory 107 for the application.

During operation, according to an aspect of the disclosure, the electronic system 100 is configured to keep the first memory 103 active to support memory access requirement of the electronic system 100 in the regular operation mode, and selectively turn on the second memory 107 to support high bandwidth memory access in a high bandwidth mode.

Specifically, in an example, when the applications executed on the electronic system 100 do not have functions that require high bandwidth memory access, the electronic system 100 is in a regular operation mode, and the second memory 107 is turned off (e.g., powered off or configured in a power saving mode) to save power. When an application has functions that require high bandwidth memory access, the electronic system 100 enters a high bandwidth mode. In an example, the application causes a functional circuit in the second group 150 to start operation. In another example, the application includes software instructions that require high bandwidth memory access by the CPU 162. In the high bandwidth mode, the second memory controller 130 causes the second memory 107 to be turned on (e.g., powered up or waked up), and memory space in the second memory 107 is allocated to the application. When the application is terminated and no more application requires high bandwidth memory access, the second memory controller 130 causes the second memory 107 to be turned off (e.g., powered off or configured to enter a power saving mode).

It is noted that, in an embodiment, the second memory controller 130 causes the second memory 107 to be turned on for other suitable reasons, such as for a larger memory space, and the like.

Figure 2:
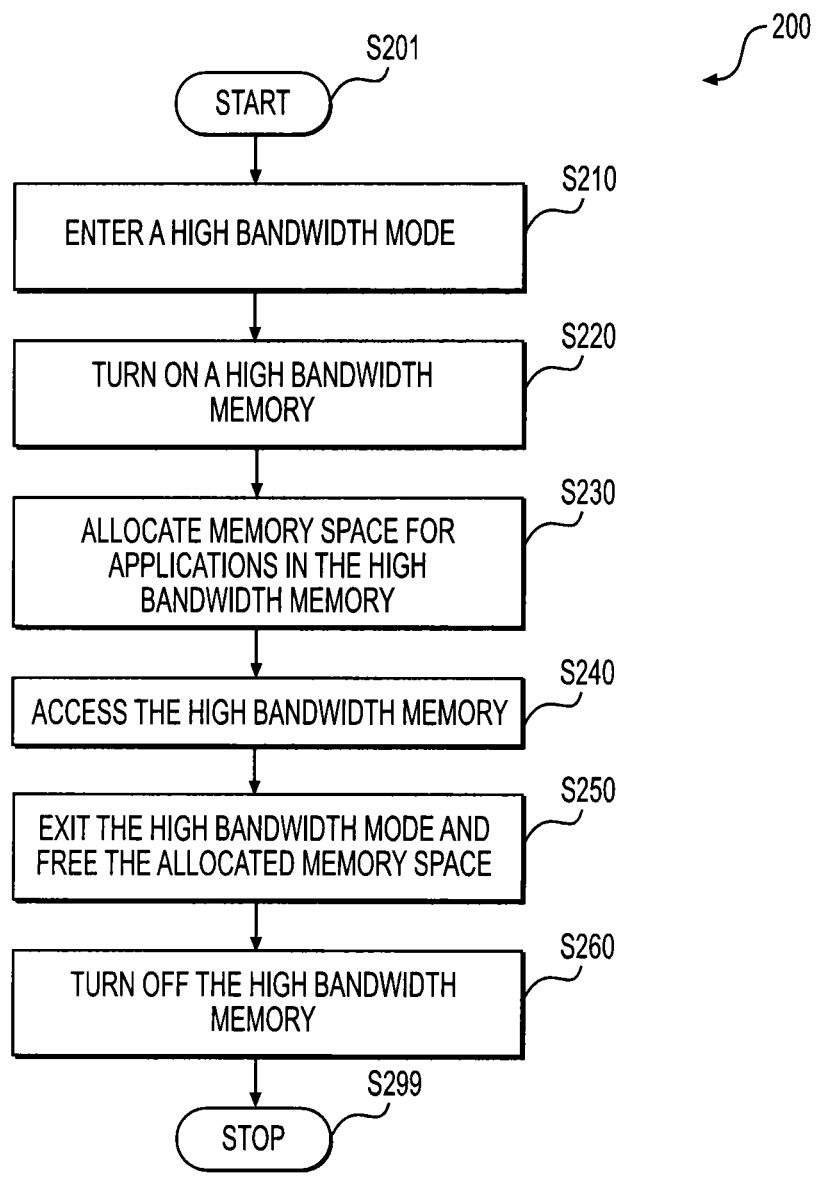
FIG. 2 shows a flow chart outlining a process example 200 according to an embodiment of the disclosure.

FIG. 2 shows a flow chart outlining a process example 100 executed in an electronic system according to an embodiment of the disclosure. In an example, the process 100 is executed in the electronic system 100 by the SOC 110. The process starts at S201, and proceeds to S210.

At S210, the electronic system enters a high bandwidth mode. In the FIG. 1 example, when an application executed on the electronic system 100 requires high bandwidth memory access, the electronic system enters the high bandwidth mode. In an example, the application includes functions to be performed by the functional circuits in the second group 150. In another example, the application includes software instructions that require high bandwidth memory access by the CPU 162.

At S220, a high bandwidth memory is turned on. In the FIG. 1 example, when the electronic system 100 is in the regular operation mode, the second memory controller 130 causes the second memory 107 to be turned off. When the electronic system 100 enters the high bandwidth mode, the second memory controller 130 sends signals to cause the second memory 107 to be turned on.

At S230, a memory space in the high bandwidth memory is allocated for an application requiring high bandwidth memory. In the FIG. 1 example, the electronic system 100 allocates memory space, such as buffers and the like, for the application in the second memory 107.

At S240, the high bandwidth memory is accessed for the application executed on the electronic system to satisfy high bandwidth requirements. In the FIG. 1 example, the functional circuits in the second group 150 that perform functions in the application access the allocated buffers in the second memory 107 via the second memory controller 130; and the functional circuits in the third group 160 perform functions for the application based on the allocated memory space in the second memory 107.

At S250, the electronic system exits the high bandwidth mode and frees the allocated memory space in the high bandwidth memory. In the FIG. 1 example, when the application is terminated and no more application requires high bandwidth memory access, the electronic system 100 exits the high bandwidth mode, and frees the allocated buffer in the second memory 107.

At S260, the high bandwidth memory is turned off. In the FIG. 1 example, the second memory controller 130 sends signals to the second memory 107 to cause the second memory 107 to be turned off, such as to be powered off, or to be configured in a power saving mode. Then, the process proceeds to S299 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An integrated circuit, comprising:
a first memory controller configured to control memory access to a first memory that stays turned on during a first operation of the integrated circuit, the first memory being one of synchronous dynamic random access memory (SDRAM) and double data rate (DDR) SDRAM;
a second memory controller configured to control memory access to a second memory that is turned on/off during the first operation based on a requirement of an application, the second memory being turned on when the application requires a type of operation that demands a higher bandwidth or power than a bandwidth or power that the first memory has, the first memory having a first bandwidth or a first power, the first memory configured to process a first type of operations, the second memory having a second bandwidth or a second power, the second memory configured to process a second type of operations, the second bandwidth being higher than the first bandwidth, and the second power being higher than the first power, the second memory being double data rate type three (DDR3) SDRAM;
at least one functional circuit coupled with the second memory controller and configured to operate based on the second memory, and the second memory controller being configured to cause the second memory to be turned on when the application requires an operation of the at least one functional circuit coupled with the second memory controller; and
at least another functional circuit coupled with both the first memory controller and the second memory controller, the at least another functional circuit configured to selectively operate with (i) the first memory controller or otherwise operate with (ii) the second memory controller, wherein the at least another functional circuit operates with (i) the first memory controller for processing images when a first resolution is required and (ii) the second memory controller for processing images when a second resolution that is higher than the first resolution is required.

2. The integrated circuit of claim 1, wherein the second memory controller is configured to cause the second memory to be turned off in response to a termination of the application.

3. The integrated circuit of claim 1, wherein:
the first memory controller is configured to control memory access to the first memory; and
the second memory controller is configured to control memory access to the second memory having a higher power consumption than the first memory and having a higher bandwidth than the first memory.

4. The integrated circuit of claim 3, wherein the second memory controller is configured to cause the second memory to be turned on when the first memory lacks bandwidth to support operation of other functional circuits in the integrated circuit.

5. The integrated circuit of claim 1, wherein:
the second memory controller is configured to control memory access to the second memory that is not compatible with the first memory.

6. The integrated circuit of claim 1, wherein the second memory controller is configured to enable the at least one functional circuit to access an allocated buffer in the second memory.

7. The integrated circuit of claim 1, wherein the at least one functional circuit is a first functional circuit, the integrated circuit further comprises:
a second functional circuit coupled to the first memory controller and configured to operate based on the first memory.

8. The integrated circuit of claim 1, wherein
the at least another function circuit is configured to operate based on the first memory when the second memory is turned off, and to operate based on the second memory when the second memory is turned on.

9. A method for memory access by an integrated circuit, comprising:
operating based on memory access to a first memory with a second memory being turned on/off during a first operation based on a requirement of an application, wherein the first memory stays turned on during the first operation of the integrated circuit, the first memory having a first bandwidth or a first power, the first memory configured to process a first type of operations, the second memory having a second bandwidth or a second power, the second memory configured to process a second type of operations, the second bandwidth being higher than the first bandwidth, and the second power being higher than the first power;
controlling the memory access to the first memory by a first memory controller, the first memory being one of synchronous dynamic random access memory (SDRAM) and double data rate (DDR) SDRAM;
controlling the memory access to the second memory by a second memory controller, the second memory being double data rate type three (DDR3) SDRAM;
activating at least one functional circuit configured to operate based on the second memory;
causing the second memory to be turned on when the application requires a type of operation that demands a higher bandwidth or power than a bandwidth or power that the first memory has;
accessing the second memory to support an operation of the at least one functional circuit configured to operate based on the second memory;
activating at least another functional circuit coupled with both the first memory controller and the second memory controller, wherein the at least another functional circuit configured to selectively operate with (i) the first memory controller or otherwise operate with (ii) the second memory controller, wherein the at least another functional circuit operates with (i) the first memory controller for processing images when a first resolution is required and (ii) the second memory controller for processing images when a second resolution that is higher than the first resolution is required.

10. The method of claim 9, further comprising:
causing the second memory to be turned off when the operation of the at least one functional circuit terminates.

11. The method of claim 9, wherein the second memory has a higher power consumption than the first memory and has a higher bandwidth than the first memory.

12. The method of claim 11, further comprising:
causing the second memory to be turned on when the first memory lacks bandwidth to support operation of other functional circuits in the integrated circuit.

13. The method of claim 9, wherein accessing the second memory to support an operation of the at least one functional circuit configured to operate based on the second memory further comprises:

accessing the second memory that is not compatible with the first memory via a different memory controller from the first memory.

14. The method of claim 9, wherein accessing the second memory to support the operation of the at least one functional circuit configured to operate based on the second memory further comprises:
allocating a buffer in the second memory for the operation of the at least one functional circuit configured to operate based on the second memory.

15. An electronic system, comprising:
a first memory being one of synchronous dynamic random access memory (SDRAM) and double data rate (DDR) SDRAM;
a second memory that is able to be turned on/off, the second memory being double data rate type three (DDR3) SDRAM;
an integrated circuit including:
a first memory controller configured to control memory access to the first memory that stays turned on during a first operation of the integrated circuit;
a second memory controller configured to control memory access to second memory that is turned on/off during the first operation based on a requirement of an application, the second memory being turned on when the application requires a type of operation that demands a higher bandwidth or power than a bandwidth or power that the first memory has, the first memory having a first bandwidth or a first power, the first memory configured to process a first type of operations, the second memory having a second bandwidth or a second power, the second memory configured to process a second type of operations, the second bandwidth being higher than the first bandwidth, and the second power being higher than the first power;
at least one functional circuit coupled with the second memory controller and configured to operate based on the second memory, and the second memory controller being configured to cause the second memory to be turned on when the application requires an operation of the at least one functional circuit coupled with the second memory controller; and
at least another functional circuit coupled with both the first memory controller and the second memory controller, the at least another functional circuit configured to selectively operate with (i) the first memory controller or otherwise operate with (ii) the second memory controller, wherein the at least another functional circuit operates with (i) the first memory controller for processing images when a first resolution is required and (ii) the second memory controller for processing images when a second resolution that is higher than the first resolution is required.

16. The electronic system of claim 15, wherein the second memory controller is configured to cause the second memory to be turned off in response to a termination of the application.

17. The electronic system of claim 15, wherein:
the second memory has a higher power consumption than the first memory and has a higher bandwidth than the first memory.

18. The electronic system of claim 17, wherein the second memory controller is configured to cause the second memory to be turned on when the first memory lacks bandwidth to support operation of functional circuits in the integrated circuit.

19. The electronic system of claim 15, wherein the at least one functional circuit coupled with the second memory controller is a first functional circuit, the integrated circuit further includes:
a second functional circuit coupled to the first memory controller and configured operate based on the first memory.

20. The electronic system of claim 15, wherein
the at least another functional circuit is configured to operate based on the first memory when the second memory is turned off, and to operate based on the second memory when the second memory is turned on.

* * * * *